(12) United States Patent
Villigran

(10) Patent No.: US 9,504,273 B2
(45) Date of Patent: Nov. 29, 2016

(54) SWEET POTATO COMPOSITIONS

(71) Applicant: KELLOGG NORTH AMERICA COMPANY, Battle Creek, MI (US)

(72) Inventor: Maria Dolores Martinez-Serna Villigran, Mason, OH (US)

(73) Assignee: KELLOGG NORTH AMERICA COMPANY, Battle Creek, MI (US)

( * ) Notice: Subject to any disclaimer, the term of this patent is extended or adjusted under 35 U.S.C. 154(b) by 0 days.

(21) Appl. No.: 13/719,316

(22) Filed: Dec. 19, 2012

(65) Prior Publication Data
US 2013/0108765 A1 May 2, 2013

Related U.S. Application Data

(63) Continuation of application No. 11/448,236, filed on Jun. 7, 2006, now abandoned.

(60) Provisional application No. 60/688,853, filed on Jun. 9, 2005.

(51) Int. Cl.
| | |
|---|---|
| *A23L 1/214* | (2006.01) |
| *A21D 2/36* | (2006.01) |
| *A21D 13/00* | (2006.01) |
| *A23L 1/2165* | (2006.01) |
| *A23L 1/217* | (2006.01) |

(52) U.S. Cl.
CPC ............. *A23L 1/2142* (2013.01); *A21D 2/366* (2013.01); *A21D 13/0096* (2013.01); *A23L 1/2165* (2013.01); *A23L 1/2175* (2013.01)

(58) Field of Classification Search
CPC A21D 2/366; A21D 13/0096; A23L 1/2175; A23L 1/2165; A23L 1/2142
USPC .................................................. 426/550, 560
See application file for complete search history.

(56) References Cited

U.S. PATENT DOCUMENTS 5,204,137 A * 4/1993 Slimak .......................... 426/637
2003/0026881 A1 * 2/2003 Villagran et al. ............. 426/560

FOREIGN PATENT DOCUMENTS

JP 7099915 A * 4/1995

* cited by examiner

*Primary Examiner* — Vera Stulii
(74) *Attorney, Agent, or Firm* — Honigman Miller Schwartz and Cohn LLP; Fernando Alberdi; Kelly T. Murphy

(57) ABSTRACT

A sweet potato snack chip which is made by cooking dough that contains a sweet potato flour composition that includes sweet potato powder, sweet potato flakes and mixtures of these. The sweet potato snack chip has a chip density of from about 0.6 g/ml to about 2.0 g/ml, and a chip fracture strength of from about 400 gf to about 900 gf. The preferred dough formed from the sweet potato flour composition is sheetable and cohesive. Fabricated snacks made from this dough have desirable taste and texture characteristics.

18 Claims, No Drawings

SWEET POTATO COMPOSITIONS

CROSS REFERENCE TO RELATED APPLICATIONS

This application is a continuation of prior application Ser. No. 11/448,236, filed Jun. 7, 2006, which claims the benefit of U.S. Provisional Application Ser. No. 60/688,853, filed Jun. 9, 2005. Both applications are herein incorporated by reference.

FIELD OF THE INVENTION

The present invention relates to sweet potato flour compositions and to food products comprising sweet potato flour compositions, especially fabricated snack products comprising sweet potato flour compositions.

BACKGROUND OF THE INVENTION

Fabricated snack products prepared from dough comprising starch-based materials are well-known in the art. These doughs typically comprise dehydrated potato products such as dehydrated potato flakes, granules, and/or flanules. The dough can also comprise a number of other starch-based ingredients, such as wheat, corn, rice, tapioca, barley, cassava, oat, sago, and potato starches, as well as flours. These other starch-based ingredients are typically included in the dough in lesser quantities than the dehydrated potato products. But these conventional flours and starches are typically low in both natural sugar and fiber. Thus the fabricated snack products lack the consumer preferred sweet taste and the nutritionally beneficial high fiber content.

Sugar and fiber can be added to the dough to increase the sweetness and nutritiousness of a fabricated snack product, but not without problems. Added fiber can negatively affect the flavor and texture of the snack product, and high levels of added sugar has a negative effect on the taste and texture of the product when cooked at high temperatures. For example, dough that comprises dehydrated potato products with sufficient added sugar such that when the dough is fried it forms a sweet tasting snack chip, will produce a rubbery, soggy and not glassy chip.

Consumers strongly prefer crisp, dense snack chips.

Sweet potatoes are naturally high in reducing sugar, vitamins and fiber. These qualities make them an excellent candidate for use in sweet tasting snack product. But formulating consumer acceptable snack products from sweet potatoes has been problematic at best, and in most cases entirely unsuccessful.

Specifically, sweet potatoes can be sliced and fried like a standard potato, but the results are substantially different. Natural products such as sweet products with high reducing sugars during cooking become rubbery and to bring them to the glassy state requires more energy, that is, they must be cooked at very high temperature. Increasing the temperature causes the product to burn or caramelized, with the resulting off-flavor and bitter taste. Therefore, the manufacturer faces the option of either frying the product to high moisture content in the finished snack, which retains the flavor but does not provide the requisite crispness, or cook the product more to make it crispy, but with a burnt flavor. This results in products with substantial variation in color, and in finished moisture content, which affect texture and product stability.

Product stability is important and relates to how fast the product will become soggy or stale, and how the product will oxidize because of the high water content. A fried slice of sweet potato, for example, will become soggy and much less crisp much faster than a standard fried potato chip when the two products are exposed to the environment. Consumers have grown accustomed to snack chips with a crispy texture and eating quality of potato, corn, and wheat based snacks, and breaking from that established equity is difficult. Moreover, the color and texture of sweet potato varies substantially both before and after frying. Consumers prefer a standardized product. That is, when a consumer opens a bag or canister of snack products, they expect a certain degree of uniformity. Again, the color of a fried sweet potato can vary substantially.

There are sweet potato based snacks currently available. These products include whole sweet potatoes sliced and fried, extruded products, and vacuum fried chips. While these commercially available products enjoy some consumer acceptance, they are still not substitutes for, nor do they provide a crispy, crunchy and light texture comparable to that found in consumer preferred potato chips.

Hence, there exists a need for formulae and processes for making fabricated snack products with sweet potato flour, while maintaining certain textural qualities that consumers prefer. And there is a need for a dough made from a sweet potato flour composition that can consistently deliver the texture, flavor, and appearance of the product to the consumer. And there is a need for a snack chip that is made from a sheet of dough or extruded, and then fried, partially fried and then baked, or baked.

There exists also a need for formulae and processes for making snacks with relatively high levels of natural sugar, vitamins and fiber, but with the texture and taste of products favorite snacks such as potato chips.

This and other advantages of the invention will become apparent from the following disclosure.

SUMMARY OF THE INVENTION

The present invention provides a sweet potato snack chip which is made by cooking dough. The dough contains a sweet potato flour composition that comprises ingredients selected from the group consisting of sweet potato powder, sweet potato flakes and mixture thereof. The dough can be cooked by frying, extrusion, baking or mixtures thereof.

In one aspect of the present invention there is provided a sweet potato flour composition that has a WAI of from about 3 to about 8; and a Peak Viscosity from about 5 to about 130 RVU. In yet another aspect of the present invention the sweet potato flour composition contains from about 5% to about 35%, by weight of reducing sugars, and from about 5% to about 20% fiber content.

In yet another aspect of this invention a sweet potato flour composition is mixed with from about 0% to about 75%, preferably from about 15% to about 70%, and more preferably from about 40% to about 60%, by weight of, optional ingredients to form a dry blend. The dry blend preferably has a WAI ranging from about 3 to about 8, and more preferably from about 3 to about 6. The optional ingredients may comprise starch materials selected from the group consisting of whole oat flour, wheat flour, corn meal, rice flour, oat fiber, wheat fiber, rice bran, potato flour and mixtures thereof. Additionally, the dry blend preferably has a Peak Viscosity ranging from about 20 RVU to about 100 RVU, and more preferably from about 35 RVU to about 100 RVU. Moreover, the dry blend preferably has a Final Viscosity ranging from about 30 RVU to about 120 RVU, and more preferably from about 40 RVU to about 95 RVU. The optional ingredients may contain fiber from other fiber sources such as wheat, oat, soy, and the like.

In another embodiment of this invention, the dry blend described above is mixed with from about 15% to about 50%, preferably from about 20% to about 40%, and more preferably from about 20% to about 32%, by weight, added water to form dough. The dough described herein can be formed into a sheet having a sheet strength of from about 80 gf to about 350 gf, preferably from about 120 gf to about 280 gf, and more preferably from about 160 gf to about 230 gf. The sheet of dough can be cooked to form a sweet potato snack chip that has a chip density of from about 0.6 g/ml to about 2.0 g/ml, preferably from about 0.7 g/ml to about 1.5 g/ml, more preferably from bout 0.8 to about 1.0 g/ml. The sheet of dough, when cooked to form a sweet potato snack chip, produces a sweet potato chip having a chip fracture strength of from about 400 gf to about 900 gf, and more preferably from about 500 gf to about 800 gf and more preferably from about 600 to about 700 gf. The sheet of dough can be cooked by frying, extrusion, baking or mixtures thereof.

The sweet potato flour compositions of this invention, when used in fabricated snack dough, result in cohesive dough having the desired level of elasticity and in finished fabricated snack products having the desired organoleptic properties. The sweet potato flour composition can also be used to produce food products such as extruded products, baked snacks, tortilla based snacks, sauces, coatings for foods, nutritional foods, food for special needs (i.e. diabetics, etc.), dog foods, dog biscuits, baby foods and breads.

As discussed above, there are both taste and nutritional reasons for using the sweet potato flour compositions of the present invention. Specifically, sweet potato is high in natural sugar, making the snack piece sweeter than other snack chip products, it is naturally high in vitamins and fiber, and it absorbs less fat when fried. But making dough, fabricated snack products, and fried chips that contain a large percentage of conventional sweet potato flour presents certain processing and formulation difficulties. These difficulties are largely overcome by the selection of the sweet potato starting ingredients and the formulations of the present invention.

DETAILED DESCRIPTION OF THE INVENTION

A. Definitions

As used herein "sweet potato flour composition" includes sweet potatoes processed into flakes, meals, granules, pieces, puree, paste, powder and combinations. As used herein "flour" generally means combinations of flakes, meals, granules, pieces, puree, paste, powder materials.

As used herein "yellow sweet potato flour" is the sweet potato flour made from yellow sweet potatoes varieties, which have low amylose levels of phytochemicals (i.e. carotenoids, flavonoid, etc.).

As used herein, "orange sweet potato flour" includes any sweet potato flour composition made from sweet potato varieties with high levels of reducing sugars and high levels of phytochemicals (i.e. carotenoids).

As used herein "phytochemicals" refers to plant chemicals that may affect health, and also may change the appearance of the food product when is added into the formulation.

As used herein "gelatinized" includes any type of gelatinization including fully gelatinized, partially gelatinized, and pregelatinized starches.

As used herein "uncooked sweet potato flour" refers to sweet potato flour or starch that has not been cooked in any manner.

As used herein, the term "fabricated" refers to food products made from dough comprising flour, meal, and/or starch, such as those derived from tubers, grains, legumes, cereals, or mixtures thereof.

As used herein, "native starch" refers to starch that has not been pre-treated or cooked in any way, and includes but is not limited to hybrid starches.

As used herein, "dehydrated potato products" includes, but is not limited to, potato flakes, potato flanules, potato granules, potato agglomerates, any other dehydrated potato material, and mixtures thereof.

As used herein, "sheetable dough" is cohesive dough capable of being placed on a smooth surface and rolled to the desired final thickness without tearing or forming holes. Sheetable dough can also include dough that is capable of being formed into a sheet through an extrusion process.

As used herein, "starch" refers to a native or an unmodified carbohydrate polymer having repeating anhydroglucose units derived from materials such as, but not limited to, wheat, corn, tapioca, sago, rice, potato, oat, barley, and amaranth, and also refers to modified starch including but not limited to hydrolyzed starches such as maltodextrins, high amylose corn maize, high amylopectin corn maize, pure amylose, chemically substituted starches, crosslinked starches, and other modifications including but not limited to chemical, physical, thermal or enzymatic and mixtures thereof.

As used herein, "starch-based flour" refers to high polymeric carbohydrates composed of glucopyranose units, in either natural, dehydrated (e.g., flakes, granules, meal) or flour form. Starch-based flour can include, but is not limited to, potato flour, potato granules, potato flanules, potato flakes, corn flour, masa corn flour, corn grits, corn meal, rice flour, buckwheat flour, oat flour, bean flour, barley flour, tapioca, and mixtures thereof. For example, the starch-based flour can be derived from tubers, legumes, grain, or mixtures thereof.

As used herein, "modified starch materials" refers to starch based ingredients that: has different characteristics than standard or has been altered to improve its functional characteristics. Suitable modified starch materials include, but are not limited to, pregelatinized starches, low viscosity starches (e.g., dextrins, acid-modified starches, oxidized starches, enzyme modified starches), stabilized starches (e.g., starch esters, starch ethers), cross-linked starches, acetylated starches, starch sugars (e.g. glucose syrup, dextrose, isoglucose) and starches that have received a combination of treatments (e.g., cross-linking and gelatinization) and mixtures thereof.

As used herein "optional ingredients" refers to ingredients or materials that are added to the present sweet potato flour compositions to form a dry blend, which can be further mixed with added water to form dough.

As used herein the term "added water" refers to water that has been added to the dry dough ingredients. Water that is inherently present in the dry dough ingredients, such as in the case of the sources of flours and starches, is not included in the "added water."

As used herein the term "emulsifier" refers to emulsifier that has been added to the dough ingredients. Emulsifiers that are inherently present in the dough ingredients, such as in the case of the potato flakes (where emulsifier is used as a processing aid during manufacturing), are not included in the term "emulsifier."

As used herein "rapid viscosity unit" (RVU) is an arbitrary unit of viscosity measurement roughly corresponding to centipoise, as measured using the RVA analytical method herein. (12 RVU equal approximately 1 centiPoise)

The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™. The preferred non-digestible fats are fatty materials having properties similar to triglycerides, such as sucrose polyesters. These preferred non-digestible fats are described in U.S. Pat. No. 5,085,884, issued Feb. 4, 1992 to Young et al. and U.S. Pat. No. 5,422,131, issued Jun. 6, 1995 to Elsen et al. An especially preferred brand of non-digestible fats is sold under the tradename OLEAN™.

By the term "dry blend" it is meant herein the dry raw material mixed together prior to processing of the materials so mixed.

All percentages are by weight unless otherwise specified.

All documents cited herein are, in relevant part, incorporated by reference; the citation of any document is not to be construed as an admission that it is prior art with respect to the present invention.

B. Sweet Potato Flour Compositions

In one aspect of the present invention there is provided a sweet potato flour composition having a Water Absorption Index from about 3.5 to about 10; and a Peak Viscosity from about 5 RVU to about 130 RVU. The sweet potato flour composition also has a final viscosity from about 10 RVU to about 60 RVU. The sweet potato flour composition is preferably selected from the group consisting of yellow sweet potatoes, orange sweet potatoes and mixtures thereof. The sweet potato flour compositions of this invention vary in their Water Absorption Index (WAI) depending on the variety, age of the sweet potatoes, method of preparation, the degree of cooking, fiber content, and the reducing sugars level. Examples of suitable sweet potato flours are given in the table below.

| Material/Supplier | Moisture Content (%) | Reducing Sugars (%) | Amylose Content (%) | Fiber Content (%) | Process |
|---|---|---|---|---|---|
| Yellow Sweet Potato Flakes (Confoco USA, Inc. Elizabeth, NJ.). | 6-8 | 6 | 22 | 6 | Drum Drying |
| Orange Sweet Potato Flour (FDP USA, Santa Rosa, CA.). | 6-10 | 33 | 5 | 16 | Air Drying |
| Quest Int. Fruit and Vegetable Products, (Silverton, OR.). | 4-6 | 30 | 1.5 | 12 | Drum Drying |

| Material/Supplier | WAI | Peak Viscosity (RVU) | Final Viscosity (RVU) | Particle Size Distribution |
|---|---|---|---|---|
| Yellow Sweet Potato Flakes (Confoco USA, Inc. Elizabeth, NJ.). | 7.5-10.0 | 115 | 25 | Sieve # 20 ~3% Sieve # 40 ~20% Sieve # 100 ~50% Sieve # 200 ~20% Pan ~7% |
| Orange Sweet Potato Flour (FDP USA, Santa Rosa, CA.). | 3.5-5.5 | 35 | 50 | Sieve # 20 ~0% Sieve # 40 ~0% Sieve # 100 ~50% Sieve # 200 ~40% Pan ~10% |
| Quest Int. Fruit and Vegetable Products, (Silverton, OR.). | 5.0-6.5 | 10.0 | 10.8 | Sieve # 20 ~25% Sieve # 40 ~40% Sieve # 100 ~30% Sieve # 200 ~5% Pan ~0% |

The present sweet potato flour compositions are formulation tools that provide a better dough, resulting in a superior sheeted product from which the fabricated snack piece can be made. And importantly, a chip product made by frying the fabricated snack piece has superior attributes. Furthermore, if the sweet potatoes are partially or fully pre-cooked, in any other way prior to, or after, processing into flour, the sweet potato flour properties can be further modified.

The present invention provides sweet potato flour compositions that are suitable for use in making fabricated snack products. The sweet potato flour compositions, when used in fabricated snack dough, result in a cohesive dough having the desired level of elasticity and finished fabricated snack products having the desired organoleptic properties.

In a preferred embodiment, the sweet potato composition comprises yellow sweet potatoes, white sweet potatoes, or purple sweet potatoes, or combinations thereof. Furthermore, the composition can comprise sweet potato flour that is partially or fully gelatinized. For example, the sweet potato flour can be gelatinized, partially gelatinized, partially pre-cooked, pre-cooked, par-boiled, extruded, or combinations thereof in order to effect the desired starch degradation in the sweet potato flour.

Mixing together the desired quantities of various sweet potato flours can be used to make the desired sweet potato flour composition. This can be accomplished by any suitable means such as, but not limited to, mixing the sweet potatoes before cooking, drying or grinding or mixing the flours together after processing.

In a preferred embodiment, gelatinized sweet potato flour is used. In this embodiment, the composition can comprise a blend of one or more sweet potato flours that have been gelatinized to varying degrees. For example, the gelatinized sweet potato flour can comprise fully cooked sweet potato, partially cooked sweet potatoes, extruded sweet potatoes, or mixtures thereof. The fully cooked gelatinized sweet potato flour is from about 75% to about 100% gelatinized, the partially cooked sweet potato flour and the extruded sweet potato flour is from about 25% to about 100% gelatinized, and the parboiled sweet potato flour is from about 75% to about 100% gelatinized.

In a preferred embodiment, orange sweet potato flour is used as part of the sweet potato flour composition. This orange sweet potato flour comes from orange sweet potato variety, which has high levels of phytochemicals, or phytonutrients. This Phytochemicals are plant chemicals that may affect health, but are in a separate category than traditional nutrients. These chemicals are categorized into many classes of compounds including carotenoids, flavonoids, plant sterols (phytoestrogens), phenolic compounds, and the like. In general, phytochemicals work together in synergy with other nutrients found in fruits and vegetables to help protect against oxidative damage and chronic diseases. The orange color of orange sweet potato flour acts as a coloring agent for snacks, pastas, breads, and the like. Orange sweet potato flour also has a special flavor due to its high reducing sugar content. In addition, orange sweet potato flour has a low water absorption index and low amylose content, resulting in a high density and crunchy product, similar to snacks made by frying directly the sweet potato slices.

In a preferred embodiment, yellow sweet potato flour is used as part of the sweet potato flour composition. Yellow sweet potato flour comes from yellow sweet potatoes variety, which has low levels of phytochemicals, or phytonutrients. The yellow color of yellow sweet potato flour acts as a diluent for color in fried snacks. Yellow sweet potato flour also has a bland flavor due to its low reducing sugar content. In addition, yellow sweet potato flour has a high water absorption index and high amylose content. For all of these reasons, yellow sweet potato flour can be used to control not only color and sweetness, but also texture and eating quality of the finished sweet potato snack. Snacks with a higher level of yellow sweet potato flour in the formula would result in lower density and more expanded products with less dark color and less sweet flavor. Yellow sweet potatoes present processing advantages especially when the process required very high line speed, versus the orange sweet potato due to its low reducing sugar and high amylose content. Dough sheets made with sweet potatoes with very high reducing sugars are sticky and weak.

Air drying and drum drying are the preferred methods of processing the sweet potato flour for this invention. The sweet potato flour can be ground to a wide range of particle size distribution. In a particular embodiment, the composition has a particle size distribution such that about 50% of the flour remains on a sieve #100. Preferably the sweet potato flour composition has a particle size distribution wherein from about 5% to about 20% remains on a sieve #40, from about 30 to about 50% remains on a sieve #100, and from about 10% to about 40% remains on a sieve #200. Particle size distribution of the sweet potato flour is important to ensure proper hydration during mixing. Also, the particle size distribution has an effect on texture; large particles in the sweet potato flour will contribute to slow melting and tooth packing.

The sweet potato flour compositions can be used to make a dry blend used in the manufacture of food products, such as fabricated snacks. In one embodiment, the dry blend comprises from about 25% to about 100%, preferably from about 30% to about 85%, and more preferably from about 40% to about 60%, sweet potato flour composition.

C. Fabricated Snack Product Preparation

Although the use of the sweet potato flour compositions will be described primarily in terms of a preferred fabricated snack product, it should be readily apparent to one skilled in the art that the sweet potato flour compositions of the present invention can be used in the production of any suitable food products. For instance, the sweet potato flour compositions can be used to produce food products such as extruded products, breads, sauces, crackers, fried snacks, baked or dried snacks, baby foods, dog foods, dog biscuits and any other suitable food product. The production of the preferred fabricated snack product is set forth in detail below.

1. Dough Formulation

The preferred dough of the present invention comprises a dry blend and added water. Preferably, the dough comprises from about 50% to about 85% dry blend and from about 15% to about 50% added water.

a. Dry Blend

Preferred dough comprises from about 50% to about 85% dry blend, preferably from about 60% to about 75% dry blend.

The dry blend comprises from about 25% to about 100%, preferably from about 30% to about 85%, and more preferably from about 40% to about 60%, sweet potato flour composition with the balance being optional ingredients.

In one embodiment, a preferred dry blend comprising the sweet potato flour composition of the present invention and other ingredients, has a WAI ranging from about 3 to about 8, preferably from about 3.5 to about 6. In one embodiment it is preferred that the dry blend has a Peak Viscosity ranging from about 20 RVU to about 100 RVU, preferably from about 35 RVU to about 100 RVU. In another embodiment herein the preferred dry blend has a Final Viscosity ranging from about 30 RVU to about 120 RVU, preferably from about 40 RVU to about 95 RVU.

b. Added Water

Preferred dough compositions of the present invention comprise from about 15% to about 50% added water, preferably from about 20% to about 40%, and more preferably from about 20% to about 32% added water. If optional ingredients, such as maltodextrin or corn syrup solids, juices, concentrates, are added as a solution or syrup, the water in the syrup or solution is included as added water. The amount of added water also includes any water used to dissolve or disperse ingredients.

c. Optional Ingredients

Any suitable optional ingredient may be added to the dough of the present invention. Suitable optional ingredients include other starch materials, such as tapioca, oat, wheat, rye, rice, barley, barley, corn, masa, non-masa corn, peanut, and dehydrated potato products (e.g., dehydrated potato flakes, potato granules, potato flanules, mashed potato materials, and dried potato products). These other starch materials can be blended to make snacks of different compositions, textures, and flavors. Furthermore, the dry blend can comprise optional ingredients selected from the group consisting of, protein sources, fiber, minerals, vitamins, colorants, flavors, fruits, vegetables, seeds, herbs, spices, and the like.

Optional ingredient can further include ingredients used to compensate for variation in the sweet potato attributes, reducing sugars content, fiber content, and phytochemicals (carotenoids) content. Suitable optional ingredients include oat fiber, wheat fiber, soy fiber, banana flour or pure, apple flour or pure, pumpkin ingredients, other roots or tubers such as cassava flour, taro, yucca, batata, parsnip and combinations thereof. These optional ingredients are preferably selected from the group consisting of taro, yucca, batata, parsnip and mixtures thereof.

Optional ingredients also include sources of fiber, which include oat, wheat, and soy fibers. A preferable source of fiber is oat fiber with a WAI from 3-8 (SunOpta, Bedford, Mass.). Other optional ingredients include, but are not limited to, pregelatinized starches, low viscosity starches (e.g., dextrins, acid-modified starches, oxidized starches, enzyme modified starches), stabilized starches (e.g., starch esters, starch ethers), waxy rice starch or flour, cross-linked starches, acetylated starches, starch sugars (e.g. glucose syrup, dextrose, isoglucose) and starches that have received a combination of treatments (e.g., cross-linking and gelatinization) and mixtures thereof.

Additionally, optional ingredients include other flours such as corn, wheat flour, rice, tapioca starch, or other roots, such as green plantain, pumpkins, carrot flours which vary in water absorption index, peak viscosity, final viscosity, and total amylose content.

Optional ingredients can include, but are not limited to, gum, emulsifier, corn syrup solids, calcium carbonate, colorants, dough pieces, extrudates for appearance, and mixtures thereof.

An ingredient that can optionally be added to the dough to aid in its processability is emulsifier. An emulsifier is preferably added to the dough composition prior to sheeting the dough. The emulsifier can be dissolved in a fat or in a polyol fatty acid polyester such as Olean™. Suitable emulsifiers include lecithin, mono- and diglycerides, diacetyl tartaric acid esters and propylene glycol mono- and diesters and polyglcerol esters. Polyglycerol emulsifiers such as monoesters of hexaglycerols, can be used. Particularly preferred monoglycerides are sold under the trade names of Dimodan available form Danisco®, New Century, Kans. and DMG 70, available from Archer Daniels Midlands Company, Decatur, Ill.

Optional ingredients also include in-dough flavors, spices, herbs, such as cinnamon, all spice, ginger, nutmeg, and the like.

When calculating the level of optional ingredients according to the present invention, that level of optional ingredient which may be inherent in the sweet potato flour composition is not included.

2. Dough Preparation

The dough of the present invention can be prepared by any suitable method for forming sheetable dough. Typically, a loose, dry dough is prepared by thoroughly mixing together the ingredients using conventional mixers. Preferably, a pre-blend of the wet ingredients and a pre-blend of the dry ingredients are prepared; the wet pre-blend and the dry pre-blend are then mixed together to form the dough. Hobart® mixers are preferred for batch operations and Turbulizer® mixers are preferred for continuous mixing operations. Alternatively, extruders can be used to mix the dough and to form sheets or shaped pieces.

a. Sheeting

Once prepared, the dough is then formed into a relatively flat, thin sheet. Any method suitable for forming such sheets from starch-based dough can be used. For example, the sheet can be rolled out between two counter rotating cylindrical rollers to obtain a uniform, relatively thin sheet of dough material. Any conventional sheeting, milling and gauging equipment can be used. The mill rolls should preferably be heated to from about 90° F. (32° C.) to about 135° F. (57° C.). In a preferred embodiment, the mill rolls are kept at two different temperatures, with the front roller being hotter than the back roller. The dough can also be formed into a sheet by extrusion.

Dough of the present invention is usually formed into a sheet having a thickness ranging from about 0.015 to about 0.10 inches (from about 0.038 to about 0.25 cm), and preferably to a thickness ranging from about 0.019 to about 0.05 inches (from about 0.048 to about 0.127 cm), and most preferably from about 0.02 inches to about 0.03 inches (0.051 to 0.076 cm).

Dough sheets of the present invention have a sheet strength of from about 80 gf to about 350 gf, preferably from about 120 gf to about 280 gf, and more preferably from about 160 gf to about 230 gf. Moreover, the dough of the present invention is strong even when sheeted to very low thickness.

The dough sheet is then formed into fabricated snack pieces of a predetermined size and shape. The fabricated snack pieces can be formed using any suitable stamping or cutting equipment. The fabricated snack pieces can be formed into a variety of shapes. For example, the fabricated snack pieces can be in the shape of ovals, squares, circles, a bowtie, a star wheel, or a pin wheel. The fabricated snack pieces can be scored to make rippled chips as described by Dawes et al. in PCT Application No. PCT/US95/07610, published Jan. 25, 1996 as WO 96/01572.

b. Cooking

After the fabricated snack pieces are formed, they are cooked until crisp to form fabricated snack products. The fabricated snack pieces can be fried, for example, in a fat composition comprising digestible fat, non-digestible fat, or mixtures thereof. For best results, clean frying oil should be used. The free fatty acid content of the oil should preferably be maintained at less than about 1%, more preferably less than about 0.3%, in order to reduce the oil oxidation rate. Any other method of cooking or drying the dough, such as high temperature extrusion, baking, microwave heating, or combination is also acceptable.

In a preferred embodiment of the present invention, the frying oil has less than about 30% saturated fat, preferably less than about 25%, and most preferably, less than about 20%. This type of oil improves the lubricity of the finished fabricated snack products such that the finished fabricated snack products have an enhanced flavor display. The flavor profile of these oils also enhance the flavor profile of topically seasoned products because of the oils' lower melting point. Examples of such oils include sunflower oil containing medium to high levels of oleic acid.

In another embodiment of the present invention, the snack pieces are fried in a blend of non-digestible fat and digestible fat. Preferably, the blend comprises from about 20% to about 90% non-digestible fat and from about 10% to about 80% digestible fat, more preferably from about 50% to about 90% non-digestible fat and from about 10% to about 50% digestible fat, and still more preferably from about 70% to about 85% non-digestible fat and from about 15% to about 30% digestible fat. Other ingredients known in the art can also be added to the edible fats and oils, including antioxidants such as TBHQ, tocopherols, ascorbic acid, chelating agents such as citric acid, and anti-foaming agents such as dimethylpolysiloxane.

It is preferred to fry the snack pieces at temperatures of from about 275° F. (135° C.) to about 420° F. (215° C.), preferably from about 300° F. (149° C.) to about 410° F. (210° C.), and more preferably from about 350° F. (177° C.) to about 400° F. (204° C.) for a time sufficient to form a product having about 6% or less moisture, preferably from about 0.5% to about 4%, and more preferably from about 1% to about 3% moisture. The exact frying time is controlled by the temperature of the frying fat and the starting water content of the dough, which can be easily determined by one skilled in the art.

Preferably, the snack pieces are fried in oil using a continuous frying method and are constrained during frying.

This constrained frying method and apparatus is described in U.S. Pat. No. 3,626,466 issued Dec. 7, 1971 to Liepa. The shaped, constrained snack pieces are passed through the frying medium until they are fried to a crisp state with a final moisture content of from about 0.5% to about 4%, preferably from about 1% to about 2.5%.

Any other method of frying, such as continuous frying or batch frying of the snack pieces in a non-constrained mode, is also acceptable. For example, the snack pieces can be immersed in the frying fat on a moving belt or basket. Likewise, frying can occur in a semi-constrained process. For example, the fabricated snack pieces can be held between two belts while being fried in oil.

Oils with characteristic flavor or highly unsaturated oils can be sprayed, tumbled or otherwise applied onto the fabricated snack products after frying. Preferably triglyceride oils and non-digestible fats are used as a carrier to disperse flavors and are added topically to the fabricated snack products. These include, but are not limited to, butter flavored oils, natural or artificial flavored oils, herb oils, and oils with potato, garlic, or onion flavors added. This allows the introduction of a variety of flavors without having the flavor undergo browning reactions during the frying. This method can be used to introduce oils which would ordinarily undergo polymerization or oxidation during the heating necessary to fry the snacks.

The finished products from this invention have a similar texture and flavor as natural sweet potato slices that have been direct fried due to the sweet potato flour added into the formula.

D. Product Characteristics and Analytical Methods

1. Water Absorption Index (WAI)

a. Dry Ingredients and Flour Blend:

In general, the terms "Water Absorption Index" and "WAI" refer to the measurement of the water-holding capacity of a carbohydrate based material as a result of a cooking process. (See e.g. R. A. Anderson et al., *Gelatinization of Corn Grits By Roll-and Extrusion-Cooking*, 14(1):4 CEREAL SCIENCE TODAY (1969).) WAI of the chip describes how much water will take the chip to melt/dissolve, which is also an indirect measurement of the texture of the chip and eating quality. In this application, the snack has a low WAI, which correlates with the light texture and fast melt down.

b. Measuring WAI for Finished Product:

1. Grind 10 grams of the sample of finished product using a Cuisinart (Mini-Mate), to reduce the particle size of the sample.

2. Sieve the ground sample through a US#20 sieve and weight 2 grams of this ground sample.

Follow the same steps from the method from sample preparation, hydration, measuring supernate, including calculations as for dry materials.

REFERENCES

American Association of Cereal Chemists, Eighth Edition, Method 56I-20, "Hydration Capacity of Pregelatinized Cereal Products" First approval Apr. 4, 1968. Reviewed Oct. 27, 1982.

Principle

A sample with a fine particle size is hydrated and centrifuged so that the gelled portion separates from the liquid. The liquid containing the soluble starch is poured off, the gelled portion is weighed and expressed as an index of gel weight to original sample weight.

Scope

This test method covers the measurement of water retention of pregelatinized starches and cereal products that contain pregelatinized starches. It is intended to give a measurement of the amount of water which cannot be removed from thoroughly wetted samples solely by mechanical means as applied by centrifugal force.

Equipment/Reagents/Apparatus

Centrifuge ALC (Apparecchi per Laboratori Chimici), model 4235 DiRuscio Associates, Manchester, Mo. Vel Laboratory Supplies, Louvain, Belgium 45° Fixed Angle Rotor ALC, catalog number 5233 (6 sample holder)

Tube Carriers ALC, catalog number 5011 (6 needed)

Tube Adapter ALC, catalog number 5721 (6 needed)

Centrifuge tubes VWR Cat. No.: 21010-818 (50 mL round bottom polypropylene tube, 105 mm×28.5 mm)

Balance Accurate to ±0.01 g

Water bath Must maintain constant temperature of 30° C. (±1.0)

Thermometer VWR Cat. No. 71740-188

Small metal spatula VWR Cat. No. 57949-022

Polyethylene wash bottle VWR Cat. No. 16651-987

Test Tube Rack VWR Cat. No. 60917-512

Beaker VWR Cat. No. 13910-201 (250 mL)

Timer VWR Cat. No. 62344-586

Water Distilled and deionized

Procedure

Sample Preparation:

(Note: The centrifuge is capable of analyzing a maximum of 6 samples simultaneously. This maximum sample load represents 3 analyses performed in duplicate.)

1. Shake the sample until it is homogeneous.

2. Using a felt tip marker, draw a horizontal line 18 mm below the top edge of each centrifuge tube.

3. Using a felt tip marker, label a desired number of clean, dry 50 mL centrifuge tubes.

4. Record the number and weight of the centrifuge tubes to the nearest 0.01 decimal place. (Note: Use centrifuge tubes that are approximately the same weight.)

5. Weigh 2±0.05 g of the raw material into the labeled centrifuge tube.

6. Record the weight of the added sample.

7. Analyze each sample in duplicate.

8. Repeat Steps 4-7 for each sample.

Sample Hydration:

1. Add 30 mL of 30° C. distilled water to each centrifuge tube.

2. Using a small metal spatula, gently stir the mixture 30 times to homogeneously hydrate the sample. (CAUTION: Vigorous stirring will cause spillage, and the sample must be repeated.)

3. Before removing the stir rod, rinse it with 30° C. distilled water to minimize the amount of sample removed. Also, adequately rinse the side walls of the test tubes.

4. Repeat steps 2-3 for each sample.

5. Place the centrifuge tubes (6 maximum) into a 30° C. (86° F.±2°) distilled water bath for 30 minutes. Repeat the stirring procedure at 10, 20 and 30 minute intervals as described below:

| Stirring Frequency | |
|---|---|
| Time | Number of stirs |
| Beginning of analysis | 30 |
| After 10 minutes | 20 |
| After 20 minutes | 15 |
| After 30 minutes | 10 |

6. After heating samples for 30 minutes, remove the centrifuge tubes from the water bath. Dry each tube with a paper towel and insert them into a test tube rack.

7. Add water to the fill line.

Centrifugation:

1. Use the following equation to calculate the angular speed (RPM) required to produce a gravitational force F=1257 g:

$n = (1.125 \times 10^9 \div r)^{1/2}$ n=rpm r=radial distance from the center of rotation to the end of the sample tube (mm)

Example:

$n = (1.125 \times 10^9 \div 115)^{1/2}$ $n = 3127 \approx 3130$ RMP

NOTE: The calculated RPM should be used as a starting point to verify the instrument. Using a well characterized raw material and data from a verified instrument, the RPM may require further adjustment to provide the same results as a previously verified centrifuge.

2. Adjust the RPM setting to the calculated angular speed.

3. Transfer the tubes to the centrifuge. (Note: An even number of samples must be analyzed to balance the sample load.)

4. Centrifuge the tubes for 15 minutes at the calculated angular speed.

5. After 15 minutes, allow centrifuge to coast to a complete stop. (CAUTION: Braking the centrifuge will lead to erroneous results.)

Measuring the Supernate:

1. Immediately remove the centrifuge tubes from the centrifuge and quickly decant the supernatant from each tube.

Caution:

This is the most important step of the analysis.

If the gel pellet is inadvertently disturbed or removed, the analysis must be repeated.

2. Accurately weigh and record the weight of the tube and contents to +0.01.

Calculations

Water absorption index $(WAI) =$ $$\frac{(\text{weight of gel} + \text{weight of tube}) - \text{weight of tube}}{\text{sample weight}}$$

Each mass is measured by ±0.01 g. Record each WAI value, the average of the triplicate sample, and the standard deviation.

2. Rheological Properties Using the Rapid Visco Analyzer (RVA)

REFERENCES

Applications Manual for the Rapid Visco Analyser, Version 1, Newport Scientific, 1998.

American Association of Cereal Chemists (AACC), 1995. Determination of the pasting properties of rice with the Rapid Visco-Analyser. AACC Method 61-02, First Approval Oct. 26, 1994, Approved Methods of Analysis, 9th Edition, Amer. Assoc. Cereal. Chem., St. Paul Minn.

Principle

The Rapid Visco Analyzer (RVA) measures the viscosity profile of a sample undergoing a thermal cycle. As the temperature of a granular starch sample increases, the granules absorb water and swell to many times their original size. Swelling of the starch is accompanied by an increase in the sample viscosity. The viscosity behavior as a function of temperature is characteristic of the material and often correlates with the starch's degree of cook.

A sample of known moisture level is mixed in water and the viscosity profile is measured as a function of a temperature program. The output of the RVA is a viscosity-time curve. The RVA results for peak viscosity, final viscosity, and pasting temperature are recorded for each sample. Samples must be analyzed in duplicate and the results averaged.

| Equipment | |
|---|---|
| RVA, Newport Scientific | RVA model 4, Foss North America, Part #0000ARVA40, Software version 2.2 |
| RVA canisters and paddles | Foss North America, Part #8100691 |
| Distilled water | |
| Small spatula | VWR Cat. No. 57952-253 or equivalent |
| Pipets | VWR Cat. No. 14670-205 or equivalent |
| Balance | Two place balance or equivalent |
| Cork, number 8 or larger | VWR Cat. No. 59580-342 or equivalent |
| Weigh paper | VWR Cat. No. 12578-165 or equivalent |

RVA Conditions

The RVA temperature profile is as follows:

| PROFILE | | |
|---|---|---|
| Time | Type | Value |
| 00:00:00 | Temp | 50° C. |
| 00:00:00 | Speed | 960 rpm |
| 00:00:10 | Speed | 160 rpm |
| 00:01:00 | Temp | 50° C. |
| 00:04:42 | Temp | 95° C. |
| 00:07:12 | Temp | 95° C. |
| 00:11:00 | Temp | 50° C. |
| 00:13:00 | End Temp | 50° C. |

Sample Weight Determination

Sample and water weights should be corrected for the sample moisture content to give a constant dry weight. The sample moisture content must be determined by either Oven Moisture Standard Method or Mettler Moisture Method (10 g, 120° C., 10 minutes).

The following formulas are used to determine the corrected sample mass (S) and correct water mass (W) for each sample.

$$S = \frac{28 * C}{(100 - M)}$$

$$W = 28 - S$$

where S=corrected starch weight (g)
C=dry starch concentration (%)
M=actual moisture content of the starch (%)
W=corrected water weight (g)

Use these formulae to determine the amount of sample (S) and water (W) to weigh for the analysis.

Sample Preparation

1. Determine the amount of water (W) and sample (S) needed to run the analysis using the Sample Weight Determination section above.
2. Weigh the desired amount of water in a clean canister to the nearest 0.01 g.
3. Mix the sample to ensure homogeneity. Weigh the desired amount of sample on a weigh paper to the nearest 0.01 g. (Note: It is critical that the correct amount of sample to be weighed to minimize method error.)
4. Carefully pour the sample into the canister leaving no sample remaining on the weigh paper. Once the sample enters the water, the analysis must be performed within 40 seconds.
5. Place a clean, dry cork over the canister and shake vigorously by hand for 10 seconds.
6. Carefully slide stopper off canister and transfer all sample and water from the cork into the canister and then quickly scrape sample down canister walls with paddle blade. (Note: It is critical that all of the sample be transferred into the canister to minimize method error.)
7. Place paddle in the canister, fix paddle on RVA, center base of canister over heating chamber, and lower tower to start the test.
8. After the analysis, the tower will pop up. Press "Yes" to add this test to the Current Analysis Session. Remove the paddle and canister and discard. Note: the RVA canisters and paddle may only be used up to three times if thoroughly washed and dried between uses.
9. To run the next sample, repeat this process starting with step 4 under RVA preparation.

Data Analysis

From the graph of paste viscosity versus time read the maximum viscosity obtained during the heating and holding cycles of the Standard Profile (standard method). The maximum viscosity is the sample Peak Viscosity.

From the graph of paste viscosity versus time read the viscosity obtained at the end of the test after cooling. Said viscosity is the final viscosity.

3. % Soluble Amylose

The sweet potato flours from this invention have a percent of soluble amylose content from about 1 to about 26%, preferably from about 16 to about 26%, and more preferably higher than 10%. The level of soluble amylose changes depending on both the variety of the sweet potato utilized (i.e. high amylose sweet potatoes, or waxy sweet potatoes, etc.), and the process utilized to dry the material. For example sweet potato flours made by utilizing spray drying versus drum drying will have less starch damage and therefore less free or soluble amylose. The level of soluble amylose in this invention is important because it correlates with the dough properties. High soluble amylose levels in the flour translates into a strong dough and a good texture in the finished product.

The cooking and dehydration of potato introduces changes in the starch which affect its rehydration properties. The solution properties as measured in the test are related to these rehydration properties. Sweet Potato Flakes are stirred in a base solution at 60° C. for 30 minutes, centrifuged, and the clear supernatant then reacted with iodine and analyzed spectrophotometrically. The amylose is measured as the iodine complexes at 700 nm, rather than 610 nm, to avoid the interference from the amylopectin-$I_2$ complex.

Scope

This method is designed to measure the relative quantity of amylose in sweet potato flakes which is soluble in 0.1N NaOH solution under specific test conditions. The method should not be applied to other starch-bearing materials without extensive evaluation.

| Apparatus | |
|---|---|
| Clear Class A Volumetric Flasks | VWR Catalog Number 29620-XXX 25 mL and 100 mL |
| Red Class A Volumetric Flasks | VWR Catalog Number 29620-XXX 250 mL and 1000 mL |
| Class A Volumetric Pipettes | VWR Catalog Number 53046-XXX 1 mL, 2 mL, 5 mL, 10 mL, 20 mL, 50 mL |
| Balance | Analytical, accurate to ±0.0001 gram |
| HP 8453 Spectrophotometer (DAD) | Hewlett-Packard package G1111AA with PC, printer, and software |
| Disposable Cuvets | VWR Catalog Number 58017-882 (1 cm width) |
| Beaker | VWR Catalog Number 13910-201 (250 mL) |
| Centrifuge | ALC model 4235 |
| Centrifuge Rotor | ALC catalog number T111 |
| Centrifuge Tube Carriers | ALC catalog number P106 |
| Glass Centrifuge Tubes | Custom-made by LabGlass Company Part LG-4400 (43 mm × 112 mm) |
| Glass Stir Rod | VWR Catalog Number 59060-047 (6 inches long) |
| Magnetic Stirrer | VWR Catalog Number 58935-250 |
| Stir Bar | VWR Catalog Number 58948-230 |
| Constant Temperature Bath | VWR Catalog Number 13490-014 |
| Blender | VWR Catalog Number 58977-277 |
| Blender Mini-Container | VWR Catalog Number 58983-140 |
| Re-Pipette Dispenser | VWR Catalog Number 40000-070 |
| Weigh Boats | VWR Catalog Number 12577-057 |
| Thermometer | VWR Catalog Number 13306-262 |
| Timer | VWR Catalog Number 62344-586 |
| Pipet Fillers | VWR Catalog Number 57800-330 |
| Watch Glass | VWR Catalog Number 66110-065 |

| Reagents | |
|---|---|
| Sodium Hydroxide Solution, 0.1N | VWR Catalog Number VW3219-4 |
| Hydrochloric Acid (36.5-38%) | VWR Catalog Number JT9530-0 |
| Iodine | VWR Catalog Number EM-IX0125-2 |
| Potassium Iodide | VWR Catalog Number JT3168-4 |
| Reference Flake | Lot 664EF 8/8/94 (RMS 41387) |

Operation

Preparation of Solutions

A. Stock Iodine Solution

1. Weigh 0.500±0.0005 grams of iodine onto a weigh boat.
2. Weigh 5.000±0.005 grams of potassium iodide onto a weigh boat.
3. Transfer the contents of steps 1 and 2 into a red 250 mL volumetric flask, using distilled water. Make to volume with distilled water. Place magnetic stir bar into the solution, and stir for 1 hour.
4. Place the solution in a cabinet to protect it from light.

B. Reagent Iodine Solution

1. Pipette 10 mL of the Stock Iodine Solution into a red 1000 mL volumetric flask which is partially filled with distilled water.
2. Carefully pipette 2 mL of concentrated hydrochloric acid into the red 1000 mL volumetric flask.
3. Dilute to volume with distilled water.
4. Place a magnetic stir bar into the solution and stir for 1 hour.
5. Place the solution in a cabinet to protect it from light.
6. Make a fresh solution at least once per week.

Standard Curve Preparation Using a Standard Amylose Material

1. Weigh 1.08 grams (1.08 grams of reference material is equal to 1 gram of dry material) of reference flake into a weighing boat and record weight.
2. Pipette ~50 mL 0.1N NaOH using re-pipette dispenser into a 8 oz blender jar. Slowly add reference flake to prevent lumping. Use remaining NaOH to wash all of the reference flake into the blender jar. (The final volume of 0.1 NaOH is 100 mL.)
3. Cap and blend for 5 min at high speed.
4. Transfer contents into a centrifuge bottle, without rinsing. (It is not necessary to transfer all of the contents.)
5. Centrifuge at 2300 rpm for 15 min
6. First Dilution: Pipette 5 mL of supernatant into a 100 mL volumetric and dilute to volume with 0.1N NaOH. Mix well.
7. Second Dilution: Pipette 10 mL of supernatant into a 100 mL volumetric and dilute to volume with 0.1N NaOH. Mix well.
8. Third Dilution: Pipette 20 mL of supernatant into a 100 mL volumetric and dilute to volume with 0.1N NaOH. Mix well.
9. Fourth Dilution: Pipette 50 mL of the first dilution (from step 6) into a 100 mL volumetric and dilute to volume with 0.1N NaOH. Mix well.
10. Pipette 1 mL of each standard into a 25 mL flask, and proceed to Step 15 in Sample Preparation.

Sample Preparation

1. Obtain percent moisture in each sample. (Vacuum oven 16 hrs. 70° C., or 3 hr @ 130° C. in an air oven.)
2. Discard the moisture samples after obtaining % moisture data.
3. Weigh 0.20±0.005 grams of sample into a tared 250 mL beaker. Record the exact weight of sample.
4. Using the re-pipette dispenser add 100 mL 0.1N NaOH solution to the sample beaker. (Note: Remove all bubbles from the dispenser to precisely deliver 100 mL of solution.)
5. Place on a magnetic stir plate and cover with watch glass.
6. Turn the stirrer on to obtain a vortex in the liquid.
7. Mix the sample for two minutes; then remove the beaker from the stirrer
8. If a group of 4 samples are being run they can sit at this point, but for no longer than 30 minutes.
9. Place samples in the 60° C. (±0.3° C.) water bath, and start a timer. Keep each beaker covered with a watch glass. The level of water in bath should be at or above level of liquid in beaker.
10. Use a glass stir rod to gently stir samples every 10 minutes during the 30 minutes interval in the water bath. (A separate glass rod should be used for each beaker, and the stir rod should remain in the solution during the 30 minute interval.)
11. After 30 minutes, remove from bath and proceed promptly.
12. Pour the solution into a glass centrifuge tube. DO NOT RINSE or try to quantitatively transfer. (It is not necessary to transfer all of the contents into the centrifuge tube.)
13. Centrifuge at 2300±100 rpm for 15±0.5 minutes. Allow to coast to a stop—do not brake. If necessary, add a tube containing only water to balance the load.
14. Remove samples from the centrifuge and carefully pipette 1 ml of the clear supernatant into a 25 ml volumetric flask. Note: If supernatant is not clear, re-centrifuge at a greater rpm.
15. Dilute each 25 mL volumetric flask to volume with the reagent iodine reagent.
16. Prepare the BLANK SOLUTION by pipetting 1 ml of the 0.1N NaOH solution into a 25 ml volumetric flask. Dilute to volume with the iodine reagent.
17. Shake each flask well. Wait at least 10 minutes, but no longer than 30 minutes to measure the solution absorbance.

Colorimetric Determination

1. The spectrophotometer should be turned on and allowed to warm up for at least 30 minutes.
2. Set the wavelength to 700 nm.
3. Fill a disposable cuvet with distilled water, place the cuvet into the instrument, and press the "Blank" button.
4. Fill another disposable cuvet with the BLANK SOLUTION, place the cuvet into the instrument, and press the "Sample" button. Record this absorbance value for future calculation purposes.
5. To analyze each sample, fill another disposable cuvet with the desired solution, place the cuvet into the instrument, and press "Sample". Record the absorbance value for each sample.
6. After analyzing all samples, flush the solutions down the sink with plenty of water and dispose cuvets into a trash can.
7. In normal practice, the absorbance falls between 0.020 and 0.800 absorbance units. Should the absorbance be greater, reweigh a second sample which is smaller in weight and rerun.

Calculations

1. Plot a curve in Excel or on graph paper using the gram/100 ml standard concentrations as the x axis versus the absorbance @ 700 nm as the y axis. The term 0.31 is determined experimentally
2. Determine straight line slope, Y-intercept, and correlation.

$$\text{1st dilution [g/100 ml]} = \text{Amylose wt.} \times (5/100)$$

$$\text{2nd dilution [g/100 ml]} = \text{Amylose wt} \times (10/100)$$

$$\text{3rd dilution [g/100 ml]} = \text{Amylose wt} \times (20/100)$$

$$\text{4th dilution [g/100 ml]} = \text{Amylose wt} \times (5/100) \times (50/100)$$

$$(\text{Amylose g/100 mL}) = (\text{Abs@700 NM} - \text{Abs@700 NM}) - Y\text{-Intercept}$$

$$\frac{\text{Sample Blank}}{\text{Slope}}$$

$$\% \text{ Amylose} = \frac{(\text{Amylose, g/100 ml})}{\frac{(100 - \% \text{ H2O})}{100} \times (\text{Sample wt.})} \times 100 \times 0.31$$

4. Chip Density Test Procedure

The density of snacks can be related to the texture and eating quality of the snacks. The lower the density of the product the lighter texture and eating quality the product is. Low density products, such as extruded snacks, can have a slow melting eating quality and some level of tooth-packing. Products like potato and tortilla snacks have a high density, with the characteristic crunchy texture and fast melting eating quality. Direct fried sweet potato snacks have a dense texture that initially translates into a high product crunchiness and crispiness. After exposure to the environment, these snacks immediately absorb moisture, lose the crunchiness/crispiness and become soggy.

The sweet potato products of this invention have a density similar to potato, and tortilla snacks, but with a more compact texture, and a faster melt down (as shown by the low water absorption index). The products of this invention have a unique crispiness and eating quality that delivers the desired attributes from tortilla or potato snacks, and an increased crunchiness and crispiness with a rich sweet potato flavor. Products of this invention ranged from about 0.6 g/ml to about 2.0 g/ml, preferably from about 0.7 g/ml to about 1.5 g/ml, more preferably from bout 0.8 to about 1.0 g/ml. The density can be measured by the following method.

Density Measurement

Equipment

1. Graduated cylinder having an open end that is sufficiently large to accommodate unbroken snack pieces.
2. Balance
3. Glycerin (P&G Chemicals, Cincinnati, Ohio).

Procedure

1. Tare the graduated cylinder
2. Fill the graduated cylinder to the upper most graduation mark with glycerin. Insure that the filled graduated cylinder does not contain air bubbles.
3. Weigh the glycerin filled graduated cylinder and record the mass of the glycerin filled graduated cylinder to the nearest one hundredth of a gram. This is the mass of glycerin in the graduated cylinder=$m_{Glycerin}$
4. Empty the glycerin from graduated cylinder and clean the emptied graduated cylinder.
5. Tare the clean graduated cylinder from Step 4 above.
6. Place approximately 20 grams of unbroken test product in the graduated cylinder.
7. Weigh the graduated cylinder containing the test product and record the mass of the graduated cylinder containing the test product to the nearest one hundredth of a gram. This is the mass of the test product in the graduated cylinder=$m_{test\ product}$
8. Fill the graduated cylinder containing the test product to the upper most graduation mark with glycerin. Insure that the filled graduated cylinder does not contain air bubbles.
9. Within 5 minutes of performing Step 8 above, weigh the graduated cylinder containing the test product and glycerin and record the mass of the graduated cylinder containing the test product and glycerin to the nearest one hundredth of a gram. This is the mass of the test product and glycerin in the graduated cylinder=$m_{test\ product+glycerin}$
10. Empty and clean the graduated cylinder from Step 9
11. Repeat Steps 1 through 10 above, using fresh glycerin and test product, two additional times to obtain a total of three measurements per sample.
12. Average the three sample measurements to yield:

average $m_{1\ glycerin}$
average $m_{test\ product}$
average $m_{test\ product+glycerin}$ Calculations $\rho_{glycerin}$=1.2613 gm/mL (Density of glycerin, literature value)

average$V_{1glycerin}$=(average $m_{1\ glycerin}$)/($\rho_{glycerin}$)=volume of the cylinder average $m_{2\ glycerin}$=average $m_{test\ product+glycerin}$−average $m_{test\ product}$ average$V_{2\ glycerin}$=(average$m_{2\ glycerin}$)/($\rho_{glycerin}$)

average$V_{test\ product}$=average$V_{1\ glycerin}$−average$V_{2\ glycerin}$ $SV_{test\ product}$=(average$V_{test\ product}$)/(average$m_{test\ product}$)

$\rho_{test\ product}$=1/$SV_{test\ product}$

4. % Fat Analysis

The percent of total fat in a chip can be measured by standard procedures known to those in the food arts, preferably, the total fat is measured by acid hydrolysis. Specifically, the method for measuring total fat by acid hydrolysis can be found in AOAC International (2000) 17th edition AOAC International, Gaithersburg, Md., USA, Official Methods 922.06, 954.02.

6. Chip Fracture Strength

Fracture Strength is the measurement of the force required to break a chip. The fracture strength relates to the strength of the snack, and the eating quality. The higher the fracture strength, the higher the crunchiness and crispiness of the chip. The sweet potato snacks of this invention show similar values of fracture strength to the sweet potato slices that have been fried directly. The products of this invention have fracture strength higher than potato snack products. The sweet potato chips of the present invention have a fracture strength (grams force) The chip fracture from this invention is from about 400 gf to about 900 gf, and more preferably from about 500 gf to about 800 gf. Fracture strength can be measured by the following method.

Equipment

TA-XT2i Texture Analyzer from Texture Technologies, Scarsdale, N.Y., equipped with a 5 kg load cell.

Method

1. Probe and force calibrations are completed each day prior to analysis.
2. The sample is placed on the adjustable three point bend/snap fixture, with a gap of 20.30 mm, measured with electronic calipers, with the curve side facing downward. A knife blade with a flat 3 mm end is used to fracture the samples (TA-43, Texture Technologies).
3. The following settings are used:
   a. Measure force in compression
   b. Pre-test speed: 1.5 mm/s
   c. Test-speed: 0.5 mm/s
   d. Post-test speed: 10.0 mm/s
   e. Distance: 5.0 mm
   f. Trigger force: 5.0 g
4. Only chips free of cracks and breakage are analyzed. The chips are stored in sealed containers until analysis.
5. The following macro was used to analysis the data:
   a. Clear graph results
   b. Redraw
   c. Search forward
   d. Go to minimum time
   e. Go to absolute positive value (force)
   f. Mark value force (hardness), record value
   g. Mark value distance (fracturability), record value
6. An average of fifteen runs is used for the fracture strength.

7. Sheet Strength Test

The tensile test is a mechanical stress-strain test measuring the tensile strength of a dough sheet. A dough strip is mounted by its ends onto the testing machine. The dough strip is elongated at a constant rate until the strip breaks. The force (g) at which the strip breaks is the tensile strength of the dough. The output of the tensile test is recorded as force/load versus distance/time. The sheet strength can be measured by the following method.

Equipment

Stable Micro Systems Texture Analyzer TA-XT2 or TA-XT2i with 25 kg load cell capacity with Texture Expert Exceed Software and a 5 kg calibration weight.

Instron Elastomeric Grips (Catalog #2713-001), having the following replacement parts:

a.) Internal springs (Instron Part No. 66-1-50) replaced with springs made from 0.5842 mm diameter wire. The replacement springs must be 3.81 cm long, have an inside diameter of 0.635 cm, and a K factor of 0.228 N/mm Said replacement Springs can be obtained from the Jones Spring Company of Wilder, Ky. U.S.A.; and b.) Instron Part No. T2-322 is replaced, as shown in Figures 8 and 9, by a modified roller plain. Said modified roller plain is an Instron Stock Part No. T2-322 that has been machined to have a flat side 4.412 cm long and 0.9525 cm wide on said roller plain's outer surface. Said flat side is covered with Armstrong Self-adhering Tape # Tap18230 and is positioned parallel to the sample side of the Grip's Clamp Frame Lower (Instron Part No. A2-1030). The Instron Elastomeric Grips are fixed on the top and bottom of the Texture Analyzer.

Sample Preparation

1. Collect a dough sheet having a uniform thickness ranging from 0.38 mm to 2.50 mm, and a length of at least 20 cm.
2. Cut samples from the dough sheet to form dough strips that are 2.5 cm wide and 15 cm long. The strips' 15 cm length should correspond to the dough's machine direction. Cut all of the strips sequentially.
3. Protect the samples from moisture loss by placing the samples in an air-tight container. The samples must be analyzed within 10 minutes of collection to ensure that the samples are analyzed fresh.

Texture Analyzer Settings
Test Mode: Measure Force in Tension
Option: Return to Start
Pre-test speed: 3.0 mm/s
Test speed: 10 mm/s
Post test speed: 10 mm/s
Distance: 45 mm
Trigger Type: Auto
Trigger Force: 5 g
Units: grams
Distance: millimeters
Break Detect: Off
Data Analysis The sheet tensile strength for a sample is the maximum force before a sample breaks. A dough's sheet tensile strength is the average of five sample sheet strengths.

E. Examples

Particular embodiments of the present invention are illustrated by the following non-limiting examples.

Examples 1, 2

The following examples illustrate physical properties of the sweet potato flour compositions of the present invention.

TABLE 1

Sweet Potato Flour Compositions and Their Physical Properties

| Sweet Potato flour composition | Example 1 | Example 2 |
|---|---|---|
| Sweet Potato Flake (Confoco, Elizabeth, NJ) | 60 | 0 |
| Sweet Potato Powder (FDP, Santa Rosa, CA) | 40 | 100 |
| WAI | 6.5 | 4.5 |
| Moisture Content (%) | 5.0 | 6.5 |
| Peak Viscosity (RVA) | 52 | 31.2 |
| Final Viscosity (RVA) | 60 | 45.5 |

Examples 3, 4

Dough compositions are prepared from the dry blends set forth in the Table 2 below. The dough compositions of Examples 3 comprise 65% dry blend and 35% added water. All ingredients are blended in a Turbulizer® mixer to form a loose, dry dough.

The dough is sheeted by continuously feeding it through a pair of sheeting rolls forming an elastic continuous sheet without pin holes. Sheet thickness is controlled to about 0.02 inches (0.05 cm). The back roll is heated to about 90° F. (32° C.) and the front roll is heated to about 135° F. (57° C.).

The dough sheet is then cut into oval shaped pieces and fried in a constrained frying mold at about 400° F. (204° C.) until desired doneness is achieved. The frying oil is a 50/50 blend of cottonseed and corn oils. The fried pieces contain about 20-25% fat.

These products have a crisp texture, fast mouth-melt and a sweet and brown complex flavor.

The dough composition of Example 4 comprises 65% dry blend, 2% emulsifier, and 33% added water. All ingredients are blended in a Stephan or Hobart batch dough mixer to form a loose, dry dough.

The dough is sheeted by continuously feeding it through a pair of sheeting rolls forming an elastic continuous sheet without pin holes. Sheet thickness is controlled to about 0.025 inches (0.064 cm). The back roll is heated to about 50° F. (10° C.) and the front roll is heated to about 95° F. (35° C.).

The dough sheet is then cut into oval shaped pieces and fried in an open standard fryer that comprises an initial free float zone followed by a submersion zone at about 315° F. (157° C.) for about 50 seconds. The frying oil is a 50/50 blend of cottonseed and corn oils. The fried pieces contain about 25-30% fat.

TABLE 2

Dry Blends and Dough Comprising Sweet Potato Flour Compositions And Their Physical Properties

|  | Supplier | Example 3 | Example 4 |
|---|---|---|---|
| DRY BLEND (% by Weight) | | | |
| Sweet Potato powder | FDP USA, Santa Rosa, CA. | 20 | 40 |
| Sweet Potato Flakes | Confoco USA, Inc. Elizabeth, NJ.) | 40 | 0 |
| Potato Flakes | Winnemuca Farms NV | 0 | 20 |
| Pre-gel corn meal | Cargill, Chicago, Il. | 10 | 20 |
| Brown Rice Flour (BGL1080) | Sage V, Freeport, Texas | 5 | 10 |
| Oat Flour #70 | Grain Millers, St. Ansger, IA | 20 | 10 |
| Corn Syrup Solids | Grain Procession, Muscatine, IA. | 5 | 0 |

TABLE 2-continued

Dry Blends and Dough Comprising Sweet Potato Flour Compositions And Their Physical Properties

| | Supplier | Example 3 | Example 4 |
|---|---|---|---|
| DOUGH PROPERTIES | | | |
| Dry Blend (described above) | | 65% | 65% |
| Added Water | | 35% | 33% |
| Emulsifier | | 0 | 2% |
| Density (g/ml) | | 0.7 | 0.95 |
| Water Absorption Index | | 2.0 | 3.2 |
| Chip Fracture Strength (gf) | | 700 | 590 |
| Water Activity (Aw) | | 0.35 | 0.35 |
| Fat Content (%) | | 25 | 30 |

INCORPORATION BY REFERENCE

All documents cited in the Detailed Description of the Invention are, in relevant part, incorporated herein by reference; the citation of any document is not to be construed as an admission that it is prior art with respect to the present invention.

What is claimed:

1. A method for making a sweet potato snack chip comprising the steps of:
   a) providing a dry blend having a Water Absorption Index (WAI) of from about 3 to about 8 and comprising 25 to 100% by weight based on the total weight of the dry blend of a sweet potato flour composition consisting of at least one of yellow sweet potato powder, yellow sweet potato flakes, orange sweet potato powder, and orange sweet potato flakes, wherein said sweet potato flour composition has a Peak Viscosity of 5 to 130 Rapid Viscosity Units (RVU), a soluble amylose content ranging from about 1% to about 26%, and reducing sugar levels of 6 to 35% by weight based on the total weight of the sweet potato flour composition;
   b) combining said dry blend with 15 to 50% by weight water and forming a dough, said water weight based on the total weight of said dough;
   c) sheeting said dough into a sheet;
   d) cutting said sheet into a plurality of snack pieces; and
   e) cooking said snack pieces into snack chips having a fracture strength of from about 400 to about 900 grams force (gf).

2. The method of claim 1, wherein step a) comprises providing a dry blend having a Peak Viscosity of from about 20 to about 100 Rapid Viscosity Units (RVU).

3. The method of claim 1, wherein step a) comprises providing a dry blend having a Final Viscosity of from about 3 to about 120 RVU.

4. The method of claim 1, wherein step a) comprises providing a dry blend further comprising up to 75% by weight based on the total weight of the dry blend of optional ingredients.

5. The method of claim 1, wherein step a) comprises providing a sweet potato flour composition having a WAI of from about 3 to about 10.

6. The method of claim 1, wherein step a) comprises providing a sweet potato flour composition having a Final Viscosity of from about 10 to about 60 RVU.

7. The method of claim 1, wherein step a) comprises providing a sweet potato flour composition having a fiber content of from about 5 to about 20% by weight based on the total weight of the sweet potato flour composition.

8. The method of claim 1, wherein step a) comprises providing a sweet potato flour composition having a particle size distribution such that from 5 to 20% are retained on a #40 mesh screen; from 30 to 50% are retained on a #100 mesh screen and from 10 to 40% are retained on a #200 mesh screen.

9. The method of claim 1, wherein step c) comprises sheeting said dough into a sheet having a sheet strength of from about 80 to about 350 gf and a thickness of from about 0.015 to about 0.1 inches.

10. The method of claim 1, wherein step e) comprises baking said snack pieces into snack chips having a density of from about 0.6 to about 2.0 g/ml.

11. The method of claim 1, step e) comprises cooking said snack pieces by one of baking, frying, extrusion, or mixtures thereof.

12. The method of claim 11, wherein step e) comprises frying said snack pieces in an oil and constraining said snack pieces in frying molds to form snack chips of a consistent size and shape.

13. The method of claim 11, wherein step e) comprises frying said snack pieces in a digestible oil, a non-digestible oil, or a mixture thereof.

14. The method of claim 11, wherein step e) comprises frying said snack pieces in an oil having less than 30% by weight saturated fat.

15. The method of claim 11, wherein step e) comprises frying said snack pieces in a blend of from 20 to 90% non-digestible oil and 80 to 10% digestible oil.

16. The method of claim 11, wherein step e) comprises frying said snack pieces at a temperature of from about 275 to about 420° F.

17. The method of claim 1, wherein step e) comprises cooking said snack pieces into snack ships having a moisture content of 6% or less.

18. The method of claim 1, wherein said sweet potato flour composition has a soluble amylose content ranging from about 16% to about 26%.

* * * * *